(12) United States Patent
Ilg et al.

(10) Patent No.: US 12,025,468 B2
(45) Date of Patent: Jul. 2, 2024

(54) OPTICAL SENSOR WITH OVERVIEW CAMERA

(71) Applicant: HEXAGON TECHNOLOGY CENTER GMBH, Heerbrugg (CH)

(72) Inventors: Patrick Ilg, Wangen (DE); Patryk Wroclawski, Wangen (DE); Jonas Wuest, Oberriet (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 553 days.

(21) Appl. No.: 17/111,045

(22) Filed: Dec. 3, 2020

(65) Prior Publication Data

US 2021/0190483 A1 Jun. 24, 2021

(30) Foreign Application Priority Data

Dec. 18, 2019 (EP) .................................... 19217367

(51) Int. Cl.
*G01C 3/02* (2006.01)
*G01B 11/00* (2006.01)
(Continued)

(52) U.S. Cl.
CPC .............. *G01C 3/02* (2013.01); *G01B 11/005* (2013.01); *G06T 7/521* (2017.01); *G06T 7/70* (2017.01);
(Continued)

(58) Field of Classification Search
CPC ............ G01B 11/0608; G01B 11/2518; G01B 11/005; G01B 21/047; G06T 7/70;
(Continued)

(56) References Cited

U.S. PATENT DOCUMENTS

2014/0168379 A1* 6/2014 Heidemann ........ G01B 11/2545
348/47
2014/0268178 A1* 9/2014 Atwell .................. G01B 11/24
356/614
(Continued)

FOREIGN PATENT DOCUMENTS

DE  10 2004 026090 A1  12/2005
DE  10 2013 008273 A1  1/2014
WO  2011/000435 A1  1/2011

OTHER PUBLICATIONS

European Search Report issued in corresponding application No. 19 21 7367, dated Jun. 2, 2020.

*Primary Examiner* — Sang H Nguyen
(74) *Attorney, Agent, or Firm* — Maschoff Brennan (57) ABSTRACT

A measuring system for triangulation-based distance measuring device having a light emitting unit, a light receiving unit for detecting measuring light reflected from an object and a processing unit for deriving distance information based on a detected reflection of measuring light. The system comprises a visual guiding unit projecting a visual marker onto the object. The light emitting unit and the visual guiding unit provide a light reflection onto the object by emitting the measuring light and the projection of the visual marker onto the object. The measuring system comprises a camera, the field of view of the camera being greater than the field of view of the light receiving unit and the camera captures an image covering the light reflection and the projection of the visual marker and to provide image information according to a captured image.

14 Claims, 3 Drawing Sheets

(51) Int. Cl.
 *G06T 7/521* (2017.01)
 *G06T 7/70* (2017.01)
 *H04N 5/225* (2006.01)
 *H04N 23/56* (2023.01)

(52) U.S. Cl.
 CPC ... *H04N 23/56* (2023.01); *G06T 2207/30204* (2013.01)

(58) Field of Classification Search
 CPC . G06T 7/521; G06T 2207/30204; G01C 3/02; H04N 23/56
 See application file for complete search history.

(56) References Cited

U.S. PATENT DOCUMENTS

| | | | |
|---|---|---|---|
| 2015/0317780 A1* | 11/2015 | Dumont | G01C 11/30 |
| | | | 348/47 |
| 2015/0332459 A1 | 11/2015 | Znamenskiy et al. | |
| 2016/0313114 A1* | 10/2016 | Tohme | H04N 13/257 |
| 2016/0349746 A1* | 12/2016 | Grau | G05D 1/102 |
| 2017/0094251 A1* | 3/2017 | Wolke | G06T 7/593 |
| 2017/0276472 A1 | 9/2017 | Becker et al. | |
| 2019/0154430 A1 | 5/2019 | Weston et al. | |

\* cited by examiner

OPTICAL SENSOR WITH OVERVIEW CAMERA

CROSS-REFERENCE TO RELATED APPLICATIONS

This application claims priority to European Patent Application No. 19217367.2, filed on Dec. 18, 2019. The foregoing patent application are incorporated herein by reference.

FIELD OF THE INVENTION

The present invention generally pertains to an optical measuring device comprising an overview camera in order to provide guidance for measuring an object.

BACKGROUND

It is common practice to inspect work pieces subsequent to production e.g. on a coordinate positioning apparatus, such as a coordinate measuring machine (CMM), in order to check for correctness of predefined object parameters, like dimensions and shape of the object. Moreover, a detection of a surface of an unknown object is of interest in many industrial applications. Such measurement typically also may be provided using a coordinate measuring machine or any other suitable type of scanning device.

In a conventional 3-D coordinate measurement machine, a probe head is supported for movement along three mutually perpendicular axes (in directions X, Y and Z). Thereby, the probe head can be guided to any arbitrary point in space of a measuring volume of the coordinate measuring machine and the object is measurable with a measurement sensor (probing unit) carried by the probe head. Such probing unit can be designed as a tactile probe or an optical sensor providing measurements of surfaces e.g. based on the principle of triangulation.

In a simple form of the machine a suitable transducer mounted parallel to each axis is able to determine the position of the probe head relative to a base of the machine and, therefore, to determine the coordinates of measurement points on the object being illuminated by the sensor. For providing movability of the probe head a typical coordinate measuring machine may comprise a frame structure on which the probe head is arranged and driving means for moving frame components of the frame structure relative to each other.

An advantage of using an optical sensor is that it is not in contact with the part and therefore does not deform it during the measurement or damage it, as may be the case with a tactile probe.

A further advantage of e.g. using a (line) triangulation device in combination with a CMM for measuring a surface is the amount of distance information being received by one particular time step, i.e. distance values along the entire projected triangulation line can be determined and respective coordinates can be derived. Thus, by moving the sensor along a desired measuring path an object to be measured can entirely be scanned significantly faster.

Over the past 20 years, manually operated portable CMM systems (e.g. articulated arm CMMs), comprising typically four segments linked together with one or two rotation axes per linkage and a total of six or seven axes, have become popular for non repetitive measurement tasks on the shop floor. Line triangulation devices are also used on such portable CMMs to greatly increase data capture speed.

Other portable measurement devices where triangulation units are used include optically tracked systems, either using multiple cameras to track the probe location and orientation or interferometric distance tracking devices, where the rotational axes of the probe are tracked using an additional camera.

Other applications for line triangulation sensors include fixed installations where an object is placed in front of the sensor or sensors and single line measurement(s) of the static object are made such that key features of the part can be captured in a single step without the need for expensive positioning systems.

Furthermore, a device for providing a topographic measurement of a surface can be embodied as a (hand-held) device comprising a triangulation sensor, wherein the device is guided along the surface to be measured—either manually or by a robot—and distance data is acquired by the sensor while moving the device. Additionally, the position and/or orientation of such device may continuously be determined (e.g. tracked) in a global coordinate system thus enabling a determination of absolute coordinates corresponding to the object's surface.

In general, triangulation provides a method for scanning a surface in fast and precise manner. Measuring devices working on that principle are for instance known from DE 10 2004 026 090 A1 or WO 2011/000435 A1.

In particular, a line generated by a laser unit, e.g. by moving a laser point along such line or by providing a laser fan, is generated on an object to be measured and the light reflected from the surface is detected by a camera consisting of a light sensitive image sensor (light detector) and electronics to control the image sensor and read out the image. An image of the reflected light is captured and distance information according to the contour of the detected line is derived. Based thereon, topography of the object's surface can be determined.

Above mentioned optical sensors are also used to automatically and repeatedly perform a defined measuring job for several times. The optical sensor may be attached to a robot or CMM. For that, the job to be performed has to be set-up (programmed) once. Such programming may typically be done by proving a well-worked sample in defined positional and orientational relation to the optical sensor and manually approaching and guiding the sensor while program data concerning respective positions and orientations of the sensor is generated.

Afterwards, successive scans can be performed by automatically driving the optical sensor according to the obtained positions and orientations.

For inspecting an object to be measured it can be hard to position the sensor at the correct orientation relative to the object. To overcome this problem US 2019/154430 A1 proposes an approach of emitting a marker light onto the object and detecting such marker with the measurement camera. Based on geometric data processing, the sensor can be brought into a suitable measuring position by help of the marker position.

However, application of this approach may be limited for measuring large and/or complex parts. For example, if a machine or part to inspect is large and the operator cannot get close to see the zone where the measurement takes place correct positions may still be difficult. Alternatively, if the part is complex and/or has a lot of parts/fixtures which obscure the view or if the standoff from the sensor to the part is hard to gauge without additional assistance position may become even difficult.

This problem is particularly noticeable for optical sensors where there is no physical probe tip to position near the surface of a part. In that context, optical sensors a least include laser point triangulation, laser line triangulation, chromatic confocal and stereo photogrammetry.

Therefore, there remains a problem of providing reliable and robust positioning of the sensor relative to the object.

BRIEF DESCRIPTION OF THE INVENTION

It is therefore an object of some aspects of the present invention to provide an improved device and method which enables to position a measuring probe (sensor) in a correct position (and orientation) relative to an object. A correct position provides obtaining measuring data from a senor-related measuring range.

Another object of some aspects of the present invention is to provide an improved device and method which allows for robust relative positioning even in case of difficult measuring conditions.

Some aspects of the invention generally relate to an optical measuring device for deriving distance information to a surface or object to be measured. Such measuring device is of a triangulation-based type. The invention also comprises a marking and guiding component which allows an operator of the system to reliably and robustly position and align the measuring device relative to the surface or object in a predefined measuring range.

Triangulation-based sensors typically use a light or laser line to measure the 3D location of points along the illuminated line by observing the shift of the line using a camera positioned at a certain baseline distance and orientation from the light/laser plane. However, the invention also relates to approaches which make use of a point of light (e.g. laser point) in order to perform distance measurements. The laser point may be scanned with comparatively high speed over the surface in a first direction and may be guided with slower speed according to a scanning direction (e.g. perpendicular to the first direction).

Some aspects of the invention relate to a measuring system. The measuring system comprises at least a triangulation-based distance measuring device and a visual guiding unit. The triangulation-based distance measuring device comprises a light emitting unit having a measuring light source for providing measuring light, a light receiving unit having a sensor for detecting measuring light reflected from an object to be measured and a processing unit for deriving distance information based on a detected reflection of measuring light. The visual guiding unit comprises a guiding light source for providing a projection of a visual marker onto the object. The guiding light source is different from the measuring light source.

The light emitting unit, the light receiving unit and the visual guiding unit are arranged with known spatial positions and orientations relative to each other.

The light emitting unit and the visual guiding unit are arranged relative to each other to provide a light reflection onto the object by emitting the measuring light and to provide the projection of the visual marker onto the object with defined spatial relationship depending on a particular distance and/or orientation of the triangulation-based distance measuring device relative to the object.

The measuring system comprises a camera, wherein the field of view of the camera is greater than the field of view of the light receiving unit and the camera is arranged and configured to capture an image covering the light reflection and the projection of the visual marker and to provide image information according to a captured image.

Hence, the measuring system comprises at least two light emitting units and two light detecting units.

The camera can preferably be embodied as an overview camera which provides a comparatively wide field of view. Such type of camera enables to detect the marker projection as well as the impinging measuring light simultaneously.

The camera can provide a live image, series of images or a stream, e.g. when a CMM is moving or steady. The camera may be configured to not provide live image when the sensor is measuring. The camera can be configured to capture light reflection and projection of the visual marker, but once all of them are switched-off, the camera may capture only the object that is pointing at. The camera can be configured to capture a single image by the operator calling a function in the software. The camera may be configured to capture a single image called by a program running execution at a desired spatial position in the CMM volume. The camera may be able to capture a series of images which can be composed to be a video.

According to an embodiment the system can further comprise additional sensors like for instance a thermal sensor, a tilt sensor, an acceleration sensor and/or an inertial measuring unit (IMU). Furthermore, the system may comprise a temperature controlling unit in order to provide constant measuring conditions over a defined time period.

According to an embodiment the light emitting unit may comprise a laser diode and respective optical elements, e.g. a cylindrical lens or lens-array, to emit a laser line to the object.

The light emitting unit, the light receiving unit and the camera can also provide for performing stereo-photogrammetric measurements. Here, light detection is performed by the light receiving unit and the camera simultaneously.

In one embodiment the optical axis of the light emitting unit and the optical axis of the camera can be parallel. Such relative alignment provides for precisely imaging the measuring light, e.g. a laser line, in particular avoiding any perspective distortion.

In one embodiment the optical axis of the visual guiding unit can be tilted relative to the optical axis of the camera. By such alignment a complementary triangulation measurement by means of the visual guiding unit and the camera becomes possible.

In one embodiment the optical axis of the visual guiding unit can be tilted relative to the optical axis of the light receiving unit, which allows to perform further triangulation and/or stereo-photogrammetric measurements.

In particular, the light emitting unit, the light receiving unit, the camera and the visual guiding unit are arranged with fixed spatial positions and orientations relative to each other, wherein their optical axes provide fixed orientations. In particular, the light emitting unit and the light receiving unit are arranged according to the Scheimpflug criterion.

According to an embodiment of the invention the visual marker is designed so that it provides an indication for if the triangulation-based distance measuring device is provided inside of a desired measuring range relative to the object, the indication is based on a spatial position of the light reflection relative to the visual marker.

Such particular design enables a user of the system to see by means of the two light element (measuring light and marker) at the object if the triangulation-based distance measuring device is provided in a spatial relationship (in particular distance and orientation) relative to the object in which a measurement of the object would be performed inside of a defined measuring range. In other words, the user can see if the measuring device is located within a target distance (and/or orientation) or if the device is too close or too far away from the surface of the object.

In particular, the visual guiding unit comprises a diffractive optical element which is configured to provide a particular pattern representing the visual marker.

The camera and/or the light receiving unit may further comprise a filter to select light of a particular wavelength to transmit to a respective sensor.

In one embodiment the visual guiding unit can comprises an active projection unit, in particular a digital light processing unit, which is configured to provide varying patterns representing the visual marker. Such active projection unit allows to adjust the visual marker with respect to a particular object to be measured. For instance, positioning of the sensor relative to a part with a number of boreholes and complex surface geometry is becoming easier if using a respective adjusted visual marker.

In particular, the processing unit can be configured to provide an output concerning currently derived distance information. Such additional output helps an operator to estimate proper alignment of the sensor relative to the object. E.g. the operator is becoming aware about how far away the sensor still is and may—based on that—perform a first approach with comparatively high positioning speed.

In one embodiment the measuring system comprises a display which is configured to provide the image information in an operator-observable manner.

Such display provides positioning of the sensor arrangement without having to directly see the object and impinging light while performing the alignment. By that, the alignment becomes more comfortable and robust. Furthermore, alignment of the sensor relative to the object can be performed in a kind of remote manner, i.e. the sensor can be driven by a positioning unit (e.g. CMM or robot) based on a video stream on the display which is watched by the operator. The positioning unit may be controlled by the operator or may be driven automatically. Automatic drive of the positioning unit can be provided by image processing of the captures image of the camera, deriving respective relative positions of the captured lights in the image and controlling the positioning unit so that the respective relative positions approach to a desired (nominal) relation.

The display also allows to emit measuring light and/or even the visual marker with a wavelength out of the (human-) visible range. Respective sensors (camera and/or light receiving unit) may then be designed to be sensitive to that wavelength and the sensor signals may be processed so that a representation of the emitted light can be made visible on the display.

Respectively, the measuring system may comprise a controlling unit which is configured to provide the image information to the display and to control displaying on side of the display.

In one embodiment the controlling unit is configured to provide the output concerning currently derived distance information to the display, wherein the output is designed to provide a currently determined distance to the object and/or to indicate a measure concerning a deviation from the measuring range of the triangulation-based distance measuring device. Such additional information may help the operator in the course of properly aligning the measuring device, e.g. alignment can be performed faster.

According to an embodiment of the invention the processing unit is configured to provide an alignment information, wherein the alignment information is derived by means of image processing and provides an information about an alignment of the triangulation-based distance measuring device relative to the object based on an evaluation of the spatial relationship of the light reflection and the projection of the visual marker in the image.

The alignment information can be displayed on the display, e.g. using a kind of progress bar or a green/red signal for respective indication or can be output in acoustic manner.

The alignment information can be further processed and provided to an algorithm for controlling an automatic alignment of the sensor.

Some aspects of the invention also relate to a method for aligning a triangulation-based distance measuring device relative to an object. The triangulation-based distance measuring device comprises at least a light emitting unit and a light receiving unit.

The method comprises emitting measuring light toward the object and projecting a visual marker onto the object.

The method also comprises providing a light reflection onto the object by emitting of the measuring light and providing a projection of the visual marker onto the object, both with defined spatial relationship relative to each other depending on a particular distance and/or orientation of the triangulation-based distance measuring device relative to the object. In addition, the method comprises capturing an image which covers the light reflection and the projection of the visual marker and providing image information according to the captured image.

In particular, capturing the image and providing the image information is performed continuously and the image information is provided to an operator by visually outputting.

Some aspects of the invention also relates to a computer program product having computer-executable instructions implemented for executing and respectively controlling at least the step of aligning a measuring device of
emitting measuring light toward the object,
projecting a visual marker onto the object,
providing a light reflection onto the object by emitting of the measuring light and a projection of the visual marker onto the object with defined spatial relationship depending on a particular distance and/or orientation of the triangulation-based distance measuring device relative to the object,
capturing an image which covers the light reflection and the projection of the visual marker and
providing image information according to the captured image
of a method of above, in particular when run on a controlling and/or processing unit as mentioned before.

The computer program product may comprise a respective algorithm for executing and respectively controlling.

BRIEF DESCRIPTION OF THE DRAWINGS

The system and method according to some embodiments of the invention are described or explained in more detail below, purely by way of example, with reference to working examples shown schematically in the drawings. Specifically.

DETAILED DESCRIPTION

Figure 1:
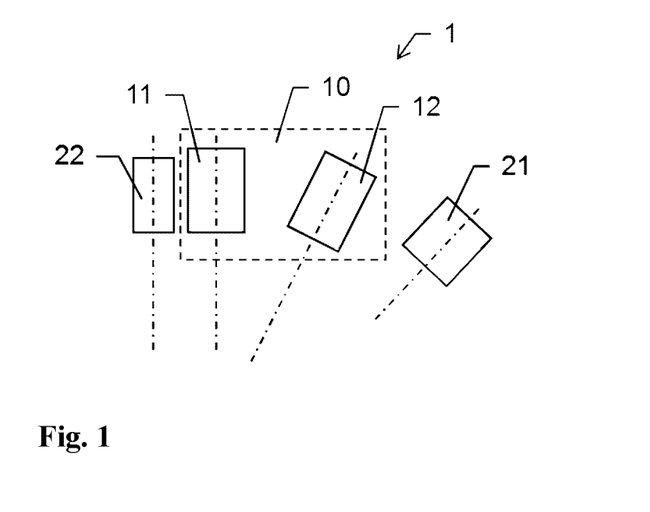
FIG. 1 shows an embodiment of a measuring system according to the invention.

FIG. 1 shows an embodiment of a measuring system 1 according to the invention. The system comprises a triangulation device 10, an overview camera 22 (OVC) and a projector 21 for providing a visual guide. The triangulation device 10 comprises a light emitting unit 11, e.g. a laser source, and a light receiving unit 12, e.g. a camera, the relative positions and orientations of which are known. As shown, the light emitting unit 11 may be aligned to be parallel to the overview camera 22. However, according to an alternative embodiment of the invention, the light emitting unit 11 may be aligned so that an optical axis of the light emitting unit 11 is tilted relative to an optical axis of the overview camera 22.

The device works according to the principle of triangulation which is to send out light in one known direction from a known position and receive reflected light from a second known position and measure the angle of the incoming light.

The light emitting unit 11 comprises a light source which may be represented by a laser diode for emitting laser light. Furthermore, the light emitting unit may comprise an optical unit for forming the emitted laser light so that a defined measuring beam can be emitted. Preferably, such measuring beam is focused according to a first direction (vertically) and diffused with respect to a second direction (horizontally), orthogonal to the first direction. By doing so, a laser line can be produced and projected onto an object to be measured.

The light receiving or detecting unit 12 may comprise an optical assembly (e.g. imaging lens) as well to form and direct the reflected light to an image sensor of that unit. The sensor preferably is designed as a CCD or CMOS sensor providing a pixel-array in form of a line or an area. The sensor is also preferably tilted according to the Scheimpflug criterion so that camera's object plane coincides with the illuminated plane so that all illuminated points are imaged sharply onto the sensor.

The image sensor is designed being at least sensitive for light of a wavelength of the measuring light. The pixels of the image sensor are exposed by the incoming reflected light and a course of the line at the object can be derived based on the illuminated pixels of the sensor. That allows determining distances to the object's surface based on the knowledge of the relative positions of emitter 11 and detector 12 and the detected line, in particular based additionally on the properties of the optical assembly and the position of the detected line on the image sensor.

According to an alternative embodiment not shown here, an additional receiving unit is provided at the left side of the emitting unit 11 in order to generate additional measuring data. There also can be arranged a third receiving unit placed beside the emitting unit 11 at the same distance than the first one (and/or second one) or at different distances to achieve a higher robustness against the detection of objects with a strong contrast change (introducing a shift of the detected intensity centroid) or the detection of edges causing shadowing effects.

By moving the triangulation system 1 over the object, continuously receiving the reflected light and processing signals provided by the image sensor, the surface of the object can be measured in its entirety. In particular, such scanning is performed by a coordinate measuring machine (either motorized or hand-held) carrying the triangulation device 1 and moving it along a desired measuring path.

According to the invention, the measuring system 1 additionally comprises an overview camera 22 and a projecting unit 21.

The projecting unit 21 (visual guiding unit) comprises a diffractive optic and a source of light. By that, a projection of a marking onto an object can be provided by means of the projecting unit 21. Due to a known and particular spatial arrangement of the projecting unit 21 relative to the triangulation device 10 the marking can be projected with respective spatial reference to the measuring laser light.

Furthermore, the marking is preferably defined to provide a pattern which enables a user of the system to easily determine if a user-visible reflection of the measuring laser light (e.g. displayed on a display) is provided inside or outside a target region of the projected marking. Due to a well-known and calibrated alignment of the projector 21 and the measuring light source 11 relative positions of the projected marking and the measuring light provide information about a distance and orientation of the triangulation sensor 10 relative to a surface onto which the projection is emitted. Such relationship also allows the user to determine if the triangulation sensor 10 is positioned with suitable measuring range relative to the surface.

Of course, a variety of different patterns are feasible to indicate if the measuring laser is inside the measuring range of the sensor.

According to one application of the system 1, indicative measurements can be recorded simultaneously to further assist the operator.

The OVC 22 provides in substantially real time (e.g. 10 Hz) a view, in particular colour view, of the scene, as seen by the camera 22. The viewable scene can be intentionally larger than the measuring range of the sensor. Such design helps for navigation of the sensor 10.

The system 1 also comprises a display (not shown). Such display may be located on or may be provided by a programming PC, on a CMM or robot pendant, by a separate tablet display, by a smartphone or by a smartwatch.

In addition, a distortion correction may be performed for image data provided by the OVC 22. The image can be transformed by computer or on the sensor to remove a fisheye distortion. Alternatively or additionally, using a freeform lens, the image can be rectified with no additional digital processing.

Figure 2:
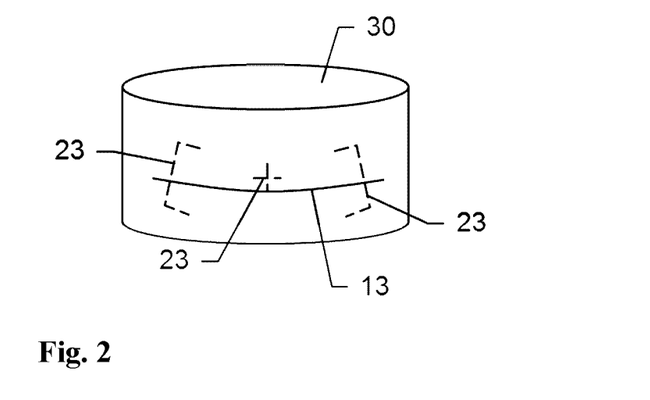
FIG. 2 show an object to be measured being irradiated by a marking pattern projection and by measuring light.

FIG. 2 shows an object 30 to be measured. Measuring light 13 is emitted towards the object and is reflected on the object's surface. The measuring light is generated on side of a light emitting unit of a triangulation-based distance measuring device according to the invention. The measuring light is generated in form of a line of light, in particular a laser line. The wavelength of the used measuring light is in a visually discernible optical wavelength range and thus is visually discernible by a human operator. Of course, the wavelength can be chosen to be invisible, however, can still be detectable by the OVC camera.

In addition, a visible marker 23 is projected onto the object 30. The wavelength of the used projection light is out of an optical wavelength range which is visually discernible by a human operator as well. The visible maker 23 is projected by a visual guiding unit of a measuring system as described above.

The visible maker 23 here comprises three elements which are two bracket-like patterns and one crosshairs-like pattern in-between.

FIG. 2 shows an alignment and positioning of the triangulation-based measuring device so that the object is situated inside of a nominal measuring range of the measuring device. Such alignment and positioning can be derived by the fact that the measuring laser line is reflected back from an area defined by the two brackets.

Figure 3A:
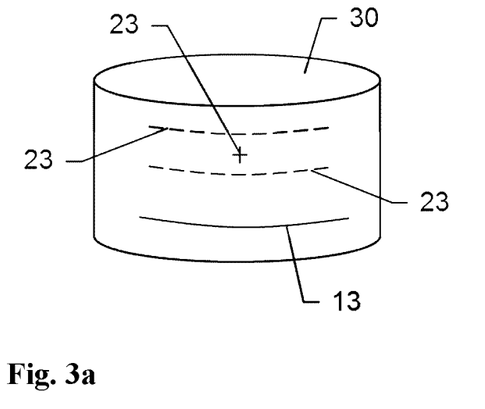
FIG. 3a-b shows particular scenarios generated by a measuring system according to the invention and an object to be measured.
Figure 3B:
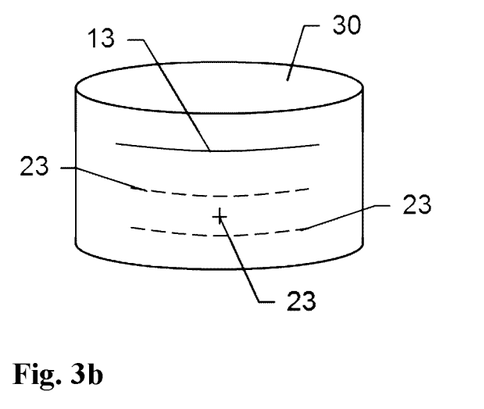

FIGS. 3a and 3b show particular scenarios generated by a measuring system according to the invention and an object to be measured 30.

The scenario according to FIG. 3a represents the projection of the marker 23 (which here comprises two horizontal lines and crosshairs in the centre) above the reflection of the triangulation measuring light 13. Such spatial relationship between the marker 23 and the measuring light 13 indicates that the measuring system, in particular the triangulation-based distance measuring device, is too close to the object and out of a valid measuring range.

On the other hand, the scenario according to FIG. 3b represents the projection of the marker 23 below the reflection of the triangulation measuring light 13. Such spatial relationship between the marker 23 and the measuring light 13 indicates that the measuring system, in particular the triangulation-based distance measuring device, is too far from the object and out of a valid measuring range as well.

By help of varying spatial positions of the marker 23 and the reflection 13, which spatial positions depend on respective distances of the measuring system to the object 30, an operator (user) of the system is enabled to place the measuring system in a manner such that the reflection 13 lies in-between the marker lines. The latter represents a position of the measuring system in correct measuring conditions, i.e. inside of a nominal (valid) measuring range.

In other words, the user is enabled to adjust the position (and orientation) of the triangulation sensor relative to the object 30 by changing (varying) the sensor position as long as the reflection 13 is located in a desired area which is defined by the visible marker 23. As soon as the latter state is reached, the sensor is provided in a valid measuring range.

A distance of the reflection 13 to one of the shown marker lines may give a hint concerning the distance of the measuring device relative to the object 30. An offset of the reflection of the centre of the mark (indicated by crosshairs) may give an information concerning an orientation of the measuring device, i.e. may provide an indication if the sensor is positioned to emit measuring light orthogonal to the surface of the object 30.

According to another embodiment (not shown) the measuring light and/or the projection light is/are emitted with a wavelength outside of a human-perceptible range, e.g. infrared or ultraviolet. Here, the camera, in particular the sensor of the camera, can be designed sensitive to impingement of light of the respective wavelength and provides image data which comprises impingement positions of the light. Such image data can be processed and displayed to a user. By that, the user is enabled to perform above described positioning even in case e.g. infrared laser light is used as measuring light.

Figure 4:
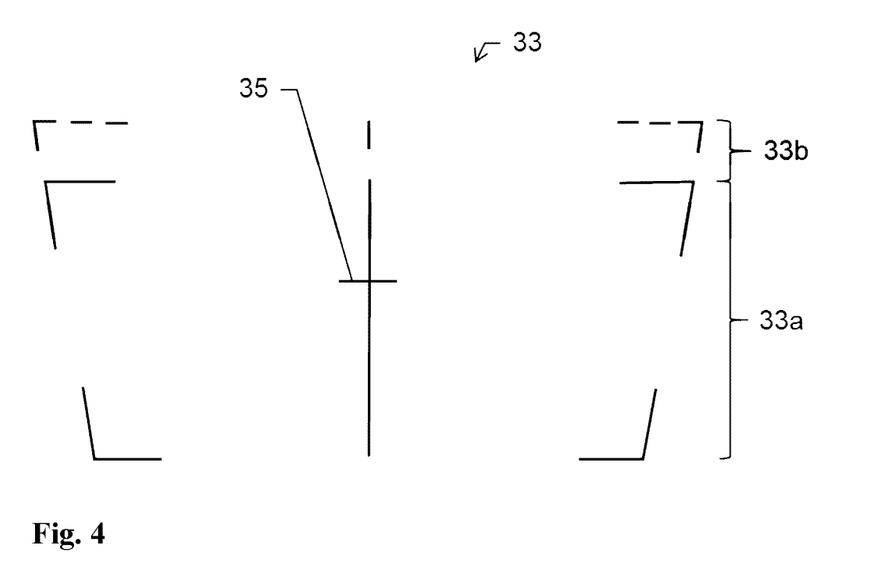
FIG. 4 shows an embodiment of a visual marker provided by a visual guiding unit according to the invention.

FIG. 4 shows an embodiment of a visual marker 33 provided by a visual guiding unit of a measuring system according to the invention.

The visual marker 33 is designed so that it provides an indication if the triangulation-based distance measuring device is provided inside of a desired measuring range relative to an object (onto which the visual marker is projected), the indication is based on a spatial position of the light reflection relative to the visual marker 33.

The visual marker 33 defines two ranges which are subtypes of an overall measuring range. A first range 33a represent a normal measuring range, a second range 33b represents an extended measuring range.

If a light reflection of the measuring light (typically a line of light) appears to be reflected from the normal range 33a, the triangulation device is supposed to be located inside a preferred measuring range (preferred distance to a surface of the object) to measure the respective object. A standard configuration of the triangulation device would be proper to sufficiently measure the surface.

If a light reflection of the measuring light appears to be reflected from the extended range 33a, the triangulation device is supposed to be located outside of a preferred measuring range but still inside of an extend measuring range to measure the respective object. A specific configuration of the triangulation device may then be applied to sufficiently measure the surface.

The extend measuring range may be a range with lower distance to the object or may be a range with greater distance to the object compared to the preferred measuring range—depending on the structural configuration of the measuring system, i.e. depending on which side of the light emitting unit the visual guiding unit is situated.

The measuring system can be configured to provide user information about preferred measuring settings, i.e. the measuring system may comprise an algorithm to analyse the positional relationship of reflected measuring light and the visual marker 33 and to derive preferred measuring settings (e.g. standard configuration, specific configuration, extended configuration etc.) based on that positional relationship.

Moreover, the visual marker 33 comprises a standoff indicator 35. If the measuring light is projected in accordance with the standoff indicator 35, the distance between the triangulation device and the object's surface corresponds to a centre of the (normal) measuring range.

Figure 5:
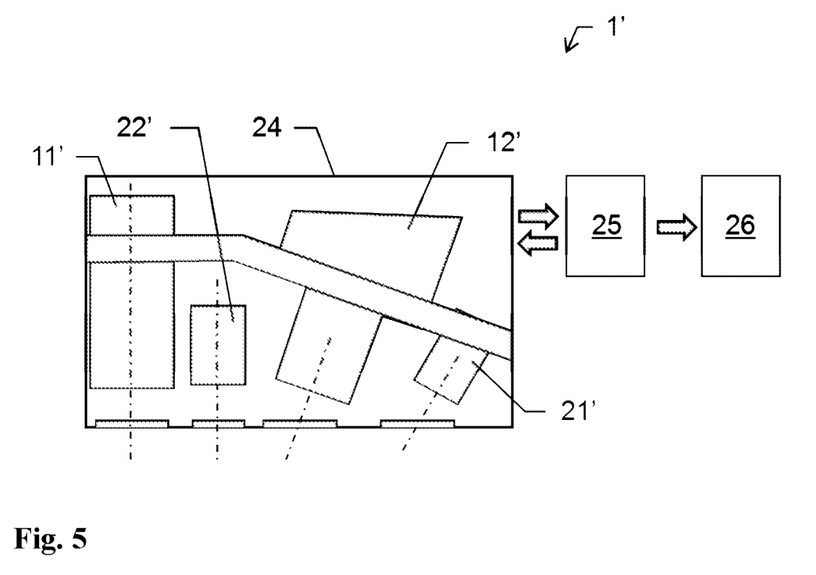
FIG. 5 shows a further embodiment of a measuring system according to the invention.

FIG. 5 shows another embodiment of a measuring system 1' according to the invention.

The system 1' comprises a laser light source 11' for emitting a laser line for measuring distances to a surface by means of triangulation. Furthermore, the system 1' comprises a light receiving unit 12' for receiving and detecting a reflection of the emitted measuring light at the surface. A triangulation-based distance measuring apparatus is provided by the latter units.

The system 1' also comprises a projector 21' (visual guiding unit) which is arranged and configured to provide a projection of a marking pattern onto the surface which the measuring light is emitted onto. In addition, an OVC 22' (overview camera) is provided for capturing an images or a video stream which covers both the measuring laser line and the marking pattern.

The system 1' optionally comprises a housing 24 as shown. The light source 11', the light receiving unit 12', the projector 21' and the OVC 22' are arranged inside of the housing 24 and are arranged with fixed spatial positions and orientations relative to each other (e.g. mounted on a common frame). The housing 24 further comprises at least one transmission window, in particular four transmission windows—one for each light emitting or receiving element. The respective optical axes of those elements extend through the window or through the windows respectively.

A processing and/or controlling unit 25 is arranged in order to receive information and/or signals provided at least by the light receiving unit 12' and/or the camera 22'. Such information and/or signals may be processed to provide respective distance information or image data concerning the locations of the marking pattern and the laser line at the surface. On the other hand, the controlling unit 25 can be configured to control the projection of the marking pattern and/or the emission of the measuring light, e.g. controlling a variation of a measuring pattern projection.

The system 1' also comprises a display 26. The display 26 receives image data from the processing and/or controlling unit 25. In that context, the display 26 is provided to display information concerning position and/or orientation of reflected measuring light and the projection of the marking pattern at the surface of an object. Furthermore, the display may output current distance information (derived by the triangulation apparatus) in order to provide further guidance information to a user.

The display 26 as well as the processing and/or controlling unit 25 may communicate (receiving and sending data) with each other or with other elements of the system 1' by means of wireless communication (WiFi, Bluetooth, NFC, radio etc.) or communication by wire. The display 26 as well as the processing and/or controlling unit 25 may be integrated into the housing of the system.

In one particular embodiment, the system 1' provides stereo-photogrammetric measurements by means of generating measuring data by the light receiving unit 12' and also by the overview camera 22'. Due to the angled alignment of the optical axes of the light receiving element 12' and the camera 22' and due to a known relative positioning of those elements, photogrammetric-measurement can be performed in precise and reliable manner.

Although the invention is illustrated above, partly with reference to some specific embodiments, it must be understood that numerous modifications and combinations of different features of the embodiments can be made and that the different features can be combined with each other or with triangulation approaches known from prior art.

What is claimed is:

1. A measuring system comprising:
    a triangulation-based distance measuring device having:
        a light emitting unit having a measuring light source for providing measuring light,
        a light receiving unit having a sensor for detecting measuring light reflected from an object to be measured, and
        a processing unit for deriving distance information based on a detected reflection of measuring light, and
    a visual guiding unit having a guiding light source for providing a projection of a visual marker onto the object, the guiding light source is different from the measuring light source,
    wherein the light emitting unit, the light receiving unit and the visual guiding unit are arranged with known spatial positions and orientations relative to each other,
    wherein the light emitting unit and the visual guiding unit are arranged relative to each other to provide:
        a light reflection onto the object by emitting the measuring light, and
        the projection of the visual marker onto the object with defined spatial relationship depending on a particular distance or orientation of the triangulation-based distance measuring device relative to the object, and
    wherein the measuring system comprises a camera, wherein the field of view of the camera is greater than the field of view of the light receiving unit, and the camera is arranged and configured to capture an image covering the light reflection and the projection of the visual marker and to provide image information according to a captured image,
    wherein the light emitting unit, the light receiving unit, the camera, and the visual guiding unit are arranged with fixed and known spatial positions and orientations relative to each other, wherein their optical axes provide fixed orientations.

2. The measuring system according to claim 1, wherein the optical axis of the light emitting unit and the optical axis of the camera are parallel.

3. The measuring system according to claim 1, wherein the optical axis of the visual guiding unit is tilted relative to the optical axis of the camera.

4. The measuring system according to claim 1, wherein the optical axis of the visual guiding unit is tilted relative to the optical axis of the light receiving unit.

5. The measuring system according to claim 1, wherein the visual marker is designed so as to provide an indication if the triangulation-based distance measuring device is provided inside of a desired measuring range relative to the object, the indication is based on a spatial position of the light reflection relative to the visual marker.

6. The measuring system according to claim 1, wherein:
    the visual guiding unit comprises a diffractive optical element which is configured to provide a particular pattern representing the visual marker, or
    the visual guiding unit comprises an active projection unit which is configured to provide varying patterns representing the visual marker.

7. The measuring system according to claim 1, wherein the processing unit is configured to provide an output concerning currently derived distance information.

8. The measuring system according to claim 7, wherein the measuring system comprises a controlling unit which is configured to provide the image information to the display and to control displaying on side of the display.

9. The measuring system according to claim 8, wherein the controlling unit is configured to provide the output concerning currently derived distance information to the display, wherein the output is designed to provide a currently determined distance to the object or to indicate a measure concerning a deviation from the measuring range of the triangulation-based distance measuring device.

10. The measuring system according to claim 1, wherein the measuring system comprises a display which is configured to provide the image information in an operator-observable manner.

11. The measuring system according to claim 1, wherein the processing unit is configured to provide an alignment information, wherein the alignment information is derived by image processing and provides an information about an alignment of the triangulation-based distance measuring device relative to the object based on an evaluation of the spatial relationship of the light reflection and the projection of the visual marker in the image.

12. A method for aligning a triangulation-based distance measuring device relative to an object, wherein the triangulation-based distance measuring device includes at least a light emitting unit and a light receiving unit, the method comprising:
    emitting measuring light toward the object by the light emitting unit;
    projecting a visual marker onto the object by a visual guiding unit;
    providing:
        a light reflection onto the object by emitting of the measuring light, and
        a projection of the visual marker onto the object with defined spatial relationship depending on a particular distance or orientation of the triangulation-based distance measuring device relative to the object;

capturing an image which covers the light reflection and the projection of the visual marker by a camera, wherein the camera is different from the light receiving unit; and providing image information according to the captured image, wherein the light emitting unit, the light receiving unit, the camera, and the visual guiding unit are arranged with fixed and known spatial positions and orientations relative to each other, wherein their optical axes provide fixed orientations.

13. The method according to claim 12,
capturing the image and providing the image information is performed continuously and the image information is provided to an operator by visually outputting.

14. A non-transitory computer program product having computer-executable instructions implemented for executing and respectively controlling at least the steps of aligning a triangulation-based distance measuring device, wherein the triangulation-based distance measuring device includes at least a light emitting unit and a light receiving unit, the steps comprising:

emitting measuring light toward the object by the light emitting unit;

projecting a visual marker onto the object by a visual guiding unit;

providing a light reflection onto the object by emitting of the measuring light and a projection of the visual marker onto the object with defined spatial relationship depending on a particular distance or orientation of the triangulation-based distance measuring device relative to the object;

capturing an image which covers the light reflection and the projection of the visual marker by a camera, wherein the camera is different from the light receiving unit; and providing image information according to the captured image, wherein the light emitting unit, the light receiving unit, the camera, and the visual guiding unit are arranged with fixed and known spatial positions and orientations relative to each other, wherein their optical axes provide fixed orientations.

* * * * *